United States Patent [19]

Sedlacek

[11] Patent Number: 4,798,566
[45] Date of Patent: Jan. 17, 1989

[54] POWER TRANSMISSION BELT

[75] Inventor: Douglas R. Sedlacek, Englewood, Colo.

[73] Assignee: The Gates Rubber Company, Denver, Colo.

[21] Appl. No.: 122,989

[22] Filed: Nov. 19, 1987

[51] Int. Cl.⁴ .............................................. F16G 5/08
[52] U.S. Cl. ..................................... 474/238; 474/263
[58] Field of Search ............................. 474/260–268, 474/238; 428/295, 605, 549, 113, 233, 239, 311.5, 374, 388, 392; 156/139, 142, 153

[56] References Cited

U.S. PATENT DOCUMENTS 1,729,329  9/1929  Chilton .......................... 474/238 X
4,432,744  2/1984  Imamura et al. .................. 474/238

OTHER PUBLICATIONS

Photomicrographs No. 1–5, showing the friction driving surfaces of a new and used prior art multi-ribbed Belt.

Primary Examiner—Thuy M. Bui
Attorney, Agent, or Firm—H. W. Oberg, Jr.; C. H. Castleman, Jr.

[57] ABSTRACT

A power transmission belt with discontinuous fiber protruding and bent from oppositely facing friction driving surfaces to expose lateral side portions of fiber.

18 Claims, 1 Drawing Sheet

POWER TRANSMISSION BELT

BACKGROUND OF THE INVENTION

The invention relates to endless power transmission belts, but more particularly, the invention relates to what some in industry term as "raw edge" belts where oppositely facing friction driving surfaces are formed of an elastomeric body and in which are dispersed transversely oriented fibrous members.

There are several belt configurations which have "raw edge" friction driving surfaces defined as part of a layer where discontinuous fiber is dispersed and transversely oriented in an elastomeric matrix. An example of a joined belt utilizing fiber dispersed in an elastomeric matrix is shown in U. S. Pat. No. 1,777,864.

An example of a "raw edge" V-Belt employing discontinuous fiber dispersed in an elastomeric matrix is shown in U.S. Pat. No. 3,416,383. The fiber is transversely oriented at angles varying from 90°.

Ribbed-belts also may have a "raw edge" construction and employ a layered construction with discontinuous fiber transversely oriented in an elastomeric matrix. U.S. Pat. No. 4,330,287 discloses such a construction.

All of the foregoing patents disclose a construction where generally the end portions of the dispersed fiber terminate or are severed at their oppositely facing friction driving surfaces; however, the '383 Patent further shows that portions of the "raw edge" may wear at a faster rate than embedded fabric layers but not faster than the surfaces where there is embedded fiber.

The friction characteristics of the driving surfaces for all of the described belts may be modified by construction where there are discrete protrusions of fiber extending beyond an elastomeric portion of the driving surfaces. The file history of the U.S. Pat. No. 3,871,240 includes photomicrographs showing that end portions of fiber are exposed at oppositely facing frictional driving surfaces of the belt. As further explained in the U.S. Pat. No. 3,871,240, cord or fabric at concentrations of 20 percent by volume are preferred although concentration as low as 5 percent may be used. This Patent also teaches, that fiber, when loaded in an elastomer at the preferred concentrations, do not give the best results.

The preferred construction of U.S. Pat. No. 3,871,240 may not be a suitable solution for all belt types because of the relative height of the friction driving surfaces. For example, the use of cord or fabric is not a desirable solution for a multi-ribbed belt because of the relative small height of the ribs.

Another use of fiber at friction driving surfaces is shown in U.S. Pat. No. 3,190,137. Flocked fiber is embedded and vulcanized into peripheral sides of oppositely facing driving surfaces leaving very little, if any protruding fiber.

SUMMARY OF THE INVENTION

A belt construction is provided which is suitable for various belt forms with oppositely facing friction driving surfaces such as V-belts, joined V-belts, and multiribbed belts. The power transmission belt of the invention is of the "raw edge" type with an elastomeric body in which is dispersed discontinuous fibers that are transversely oriented in relation to a longitudinal axis of the belt. Portions of fiber protrude from the body at the driving surfaces and are bent so as to expose lateral side portions of fiber which define part of the friction driving surfaces.

An advantage of the invention is that the lateral side portions of fiber have a greater surface area than the generally end portions of protruding fiber as disclosed and taught in the prior art. Consequently lower loadings of fiber in percent by volume may be used to alter the frictional characteristics of the oppositely facing driving surfaces.

Another advantage is realized when in a multiribbed belt of the invention is exposed to low angular frequencies of about 20 Hz and high angular acceleration (e.g., angular accelerations up to 3,000 rad/sec$^2$). The invention has the beneficial result of substantially inhibiting pilling of the lateral surfaces at the low frequencies. Consequently, belt life is improved in such applications.

In accordance with the invention, a high tenacity and wear resistant fiber is dispersed in an elastomeric matrix of which a body is formed. The matrix with dispersed fiber, is optionally ground in the presence of a moisturing liquid and oppositely-facing friction driving surfaces are formed. The fibers have sufficient tensile modulus so as to inhibit them from being cut or ground off at an elastomer interface during the grinding operation. The fibers are bent along the driving surfaces and lateral side part portions.

An object of the invention is to provide a belt construction where discontinuous fiber may be effectively used to control the frictional properties of a driving surface; a resulting advantage of the invention is that discontinuous fibers may be used at a volumetric loading of approximately half of that preferred as taught in the prior art where end portions of fiber are exposed.

Other advantages or objects of the invention will be apparent after reviewing the drawings and description of preferred embodiments. Although the invention is adaptable to power transmission belts in general, a multi-ribbed belt is shown in detail for illustration purposes wherein.

DESCRIPTION OF PREFERRED EMBODIMENTS

Figure 2:
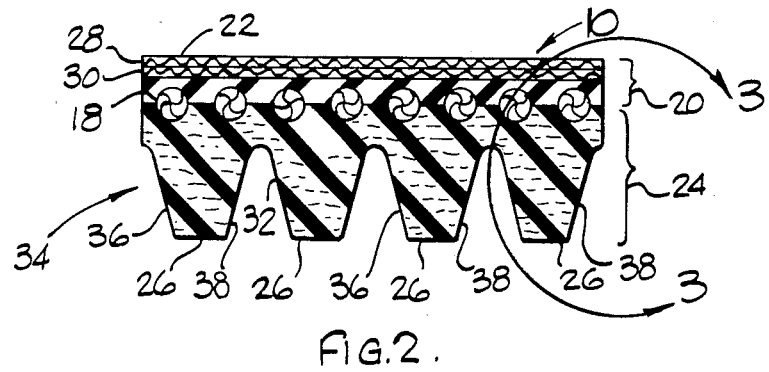
FIG. 2 is an enlarged fragmentary cross sectional view taken along the line 2—2 of FIG. 1 showing the belt in free span.
Figure 1:
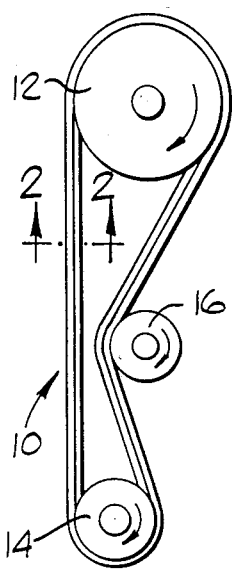
FIG. 1 is a schematic view showing a multiribbed belt of the invention trained around grooved pulleys and tensioned with a backside idler.
Figure 3:
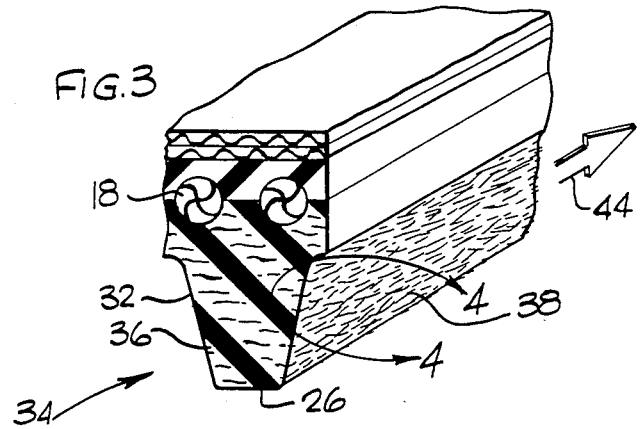
FIG. 3 is an enlarged view taken generally along the line 3—3 of FIG. 2 but showing a portion of the belt in partial isometric view to further illustrate a friction driving surface.

Referring to the Figures, a power transmission belt 10 of the invention with a multi-ribbed configuration is trained around multi-grooved pulleys 12, 14 and tensioned by a backside idler 16. The belt is fabricated using known techniques and has a tensile member 18 or load carrying section that is sandwiched between a first layer 20 forming the top portion 22 of the belt and a second layer 24 in which is formed a plurality of circumferential ribs 26. Any desired material may be used as the tensile member such as cord of cotton, rayon, nylon, polyester, aramid, steel or even discontinuous fibers oriented for load carrying capability. Any of the suitable elastomeric materials may be used in constructing the first and second layers. For example, elastomers such as synthetic rubbers, natural rubbers, blends thereof, or castable elastomers such as polyurethane may be used. One or more layers 28, 30, of a textile material may be embedded in the top of the first layer to form a wear resistance surface such as to accomodate backside idlers or pulleys in a drive system.

Discontinuous fiber 32 is dispersed in at least a major portion of that part of the second layer which forms a body portion 34 having oppositely facing friction driving surfaces 36, 38. The fiber preferably has a length in a range from about 0.04 in. (1 mm) to about 0.47 in. (12 mm); but more preferably, the fiber has a length from about 0.16 in. (4 mm) to about 0.28 in. (7 mm); and most preferably from about 0.16 in. (4 mm) to about 0.24 in. (6 mm).

It is important that the fiber have a greige tensile modulus sufficient to inhibit the fiber from being severed at the elastomer-fiber interface during a grinding operation when forming the oppositely facing sides (which is hereinafter explained in conjunction with the method of the invention). The fiber should have good wear resistant qualities so that it is not substantially worn away during belt use. Examples of fiber having suitable tension modulus and wear resistant qualities are aramid fibers, such as those sold under the trademark KEVLAR by du Pont de Nemours & Company; the trademark TECHNORA as sold by Teijin of Japan; and the trademark Twaron as sold by Enka of Holland [all having a greige tensile modulus of at least about $9 \times 10^6$ psi (6333 Kg/mm$^2$)].

The elastomeric body portion is loaded with fiber preferably from about 0.5 to about 20 percent by volume, and more preferably from about 1 to about 6 percent by volume. Most preferably, the fiber loading is about 3 percent by volume of the body portion (i.e., that portion of the body having the oppositely facing driving surfaces).

The oppositely facing friction driving surfaces 36, 38 are formed in such a manner as to leave portions of fiber protruding from the elastomer at the oppositely facing driving surfaces. Most of the fiber protrudes from about 0.004 in. (0.1 mm) to about 0.012 in. (0.3 mm) from the elastomeric body. In contrast, new prior art belts using cotton fiber have protruding portions from about 0.0026 in. (0.65 mm) to about 0.005 in. (0.13 mm). Thus, belts of the invention have fiber protruding approximately twice as far as that of known prior art belts.

Figure 4:
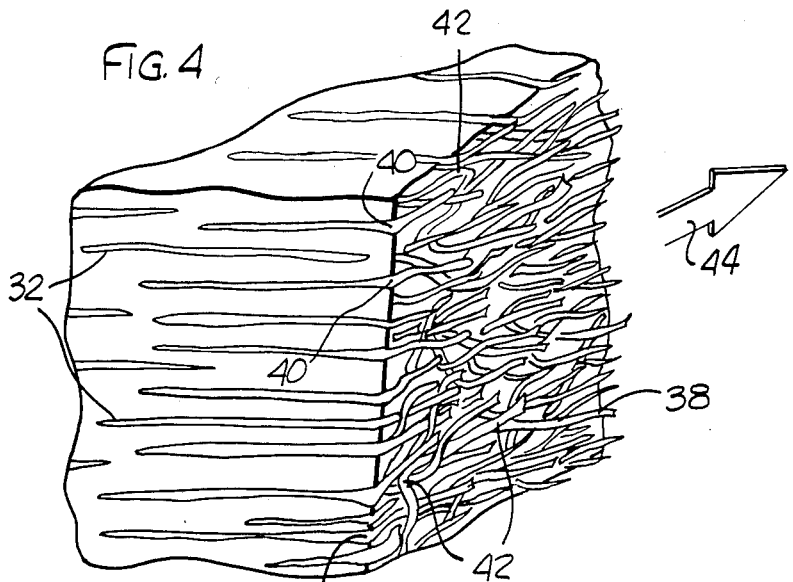
FIG. 4 is an enlarged view taken along the line 4—4 of FIG. 3 and showing protruding fibers bent to expose lateral side portions of fiber at a frictional driving surface; cross hatching is not used for clarity.

The protruding fiber portions are bent 40 against the body in such a manner as to expose lateral side portions 42 which define part of the friction driving surface. As particularly shown in FIG. 4, most of the fiber portions are bent substantially in the same general direction leaving them oriented generally longitudinally 44 with the belt driving surfaces. It is estimated that the lateral side portions of fiber cover from about 15 percent to about 52 percent of the driving surface area at fiber loadings from about 1.7 percent to about 6 percent by volume respectively.

METHOD

As previously mentioned, the elastomeric body with dispersed fiber is ground to form oppositely facing friction driving surfaces. It is already known to form oppositely facing driving surfaces by grinding elastomeric layer in which is dispersed discontinuous fiber. An example of such a grinding process is disclosed in U.S. Pat. No. 3,839,116. However, such known processes sever or terminate the fiber at the elastomeric body so that substantially only end portions of fiber are exposed.

As previously mentioned, it is important to have a fiber with a sufficiently high greige tensile modulus to inhibit severing the fiber at the elastomer-fiber interface during the grinding operation. In accordance with the invention, discontinuous fiber, such as aramid fiber, is dispersed in a elastomeric layer in known fashion and oriented transversely of the belt. The body is ground in the presence of a moisturing liquid such as water soluable oil or water. It is believed that the moisturizing liquid acts to lubricate the fiber and inhibit it from being severed at the elastomer-fiber interface. The grinding operation also operates to orient the fiber generally longitudinally along the driving surface by bending the fiber and exposing lateral side portions.

Figure 5:
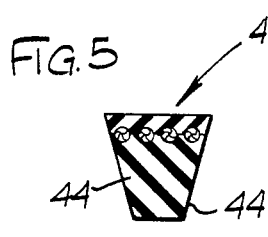
FIG. 5 is a view similar to FIG. 2 but showing a V-belt of the invention.
Figure 6:
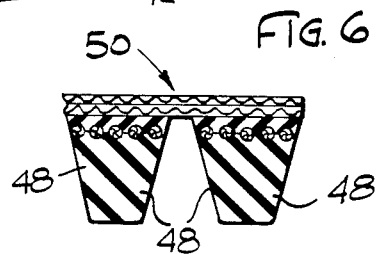
FIG. 6 is a view similar to FIG. 2 but showing a joined V-belt of the invention.

The grinding operation may be used in defining opposite facing frictional driving surfaces 44 of a V-belt 46 as illustrated in FIG. 5 or the opposite facing frictional driving surfaces 48 of a joined belt 50 such as illustrated in FIG. 6.

USE

In use, a multi-ribbed belt of the invention is used as in a serpentine front end-drive of a firing diesel engine. During operation of the engine, in such an application, low oscillatory angular frequencies of about 25 Hz. are encountered along with angular acceleration as high as about 3,000 rad/sec$^2$. A belt of the invention operated for 50 hours with no appreciable pilling as measured by a weight loss of only about 1 percent, and the protruding fiber remained substantially intact. Comparatively, a prior art belt with discontinuous cotton fiber (flock) was operated on the same engine for 50 hours where there was significant pilling as measured by a belt weight loss of about 9.7 percent; the portions of protruding cotton fiber was worn away to the elastomeric body.

A peculiar problem associated with multi-ribbed belts is that of "pilling buildup" between adjacent ribs where pills accumulate and are retained. Because of this, "weight loss" is not always a totally accurate measurement. Nevertheless, belts of the invention exhibited substantially no "pilling buildup" whereas the prior art belt exhibited "pilling buildup" accompanied with substantial weight loss.

The improved performance of the belt of the invention is attributed to the exposed lateral side portions of fiber which define part of the friction driving surface. As a fiber loading of about 5.2 percent by volume, the lateral side portion of fiber covers about 45 percent of the friction driving surfaces which is about 3 times greater than a prior art belt having substantially the same loading of cotton fiber.

The foregoing detailed description is made for purpose of illustration only and is not intended to limit the scope of the invention which is to be determined from the appended claims.

What is claimed is:

1. In a power transmission belt of the raw edge type with oppositely facing friction driving surfaces and having discontinuous fibers dispersed in and oriented transversely of an elastomeric body portion wherein improvements in the driving surfaces comprises:
  portions of fiber protruding from the body at the driving surfaces, the fiber portions bent against the body in such a manner as to expose lateral side portions of fiber which define part of the friction driving surface.

2. The power transmission belt of claim 1 wherein the driving surfaces are ground.

3. The power transmission belt of claim 1 wherein the fibers comprise from about 1 to 6 percent by volume of the elastomeric body.

4. The power transmission belt of claim 1 wherein majority fibers have a length from about 4 to about 6 mm.

5. The power transmission belt of claim 1 wherein a majority of fiber portions protruding from the body have a length from about 0.004 in. (0.1 mm) to about 0.12 in. (0.3 mm).

6. The power transmission belt of claim 1 wherein a majority of the fiber lateral side portions are oriented generally longitudinally with the driving surfaces.

7. The power transmission belt of claim 1 wherein a majority of the protruding fibers are bent in the same general direction at each driving surface.

8. The power transmission belt of claim 1 wherein the fibers are aramid.

9. The power transmission belt of claim 8 wherein the fibers are of the type as sold under the trademarks consisting of KEVLAR, TECHNORA and TWARON.

10. The power transmission belt of claim 1 wherein the protruding fibers define a means for inhibiting pilling of the elastomer at friction driving frequencies as low as about 20 Hz. and angular accelerations as high as 3,000 rad/sec$^2$.

11. In a power transmissions belt of the raw edge type with oppositely facing friction driving surfaces and having discontinuous fibers dispersed in and oriented transversely of an elastomeric body portion, wherein the improvement comprises:
  aramid fiber comprising from about 1 to about 6 percent by volume of the elastomeric body portion and portions of fibers protruding from the body at the driving surface, a majority of protruding fibers having a length from about 0.004 in. (0.1 mm) to about 0.012 in. (0.3 mm) and bent against the body in such a manner as to expose lateral side portions of fiber which define part of the friction driving surface.

12. The power transmission belt of claim 11 wherein a majority of the protruding fibers are bent in the same general direction.

13. The power transmission belt of claim 11 wherein the fibers are of the aramid type as sold under the trademarks consisting of KEVLAR, TECHNORA and TWARON.

14. The power transmission belt of claim 11 wherein the fiber has a greige tensile modulus of at least about $9 \times 10^6$ psi (6333 Kg/mm$^2$).

15. The power transmission belt of claim 11 wherein the driving surfaces are ground.

16. The power transmission belt of claim 11 wherein the driving surfaces are ground to the configuration of a multi-ribbed belt.

17. The power transmission belt of claim 11 wherein the driving surfaces are ground to the configuration of a V-belt.

18. The power transmission belt of claim 11 wherein the driving surfaces are ground to the configuration of a joined V-belt.

* * * * *